United States Patent [19]

Miyata et al.

[11] Patent Number: 5,608,008

[45] Date of Patent: Mar. 4, 1997

[54] POLYPROPYLENE RESIN COMPOSITION AND MOLDED PRODUCT

[75] Inventors: Hiroshi Miyata; Masayuki Yamaguchi; Kenichi Suzuki, all of Yokkaichi, Japan

[73] Assignee: Tosoh Corporation, Shinnanyo, Japan

[21] Appl. No.: 595,865

[22] Filed: Feb. 1, 1996

[30] Foreign Application Priority Data

Feb. 3, 1995 [JP] Japan .................................. 7-017208
Feb. 3, 1995 [JP] Japan .................................. 7-017209

[51] Int. Cl.$^6$ .......................... C08L 23/10; C08L 23/18; C08L 53/00

[52] U.S. Cl. .............................. 525/240; 525/88

[58] Field of Search ......................... 525/240, 88

[56] References Cited

U.S. PATENT DOCUMENTS

| | | | |
|---|---|---|---|
| 4,725,505 | 2/1988 | Hwo et al. | 525/240 |
| 5,290,635 | 3/1994 | Matsumura et al. | 525/240 |
| 5,391,618 | 2/1995 | Yamamoto et al. | 525/240 |

FOREIGN PATENT DOCUMENTS

| | | |
|---|---|---|
| 0170255A1 | 2/1986 | European Pat. Off. . |
| 0184324A3 | 6/1986 | European Pat. Off. . |
| 184324 | 6/1986 | European Pat. Off. . |
| 0593221A3 | 4/1994 | European Pat. Off. . |
| 0603723A1 | 6/1994 | European Pat. Off. . |
| 1694622 | 8/1971 | Germany . |
| 06192500 | 7/1994 | Japan . |
| 06339920 | 12/1994 | Japan . |

*Primary Examiner*—Carman J. Seccuro, Jr.
*Attorney, Agent, or Firm*—Oblon, Spivak, McClelland, Maier & Neustadt, P.C.

[57] ABSTRACT

A polypropylene resin composition comprising from 5 to 99.9 wt % of a polypropylene resin (A) and from 95 to 0.1 wt % of an ethylene/α-olefin copolymer elastomer (B) satisfying the following conditions (a) to (d):

(a) the α-olefin has a carbon number of from 4 to 20,
(b) the α-olefin content is larger than 65 wt % and at most 95 wt %,
(c) the density at 23° C. is less than 0.88 g/cm$^3$, and
(d) no peak of crystal fusion is observed by a DSC method.

7 Claims, No Drawings

POLYPROPYLENE RESIN COMPOSITION AND MOLDED PRODUCT

The present invention relates to a polypropylene resin composition. Particularly, it relates to a polypropylene resin composition excellent in cold resistance and resistance against whitening on impact, and a molded product thereof.

It is well known to blend an elastomer such as an ethylene/propylene elastomer (EPR) to a polypropylene resin (PP) for the purpose of improving the cold resistance, impact resistance, transparency or flexibility. For example, a method of adding an ethylene/propylene copolymer (Japanese Examined Patent Publication No. 7088/1960) or a method of adding an ethylene/butene-1 copolymer having an ethylene content of from 75 to 30 mol % (Japanese Examined Patent Publications No. 7240/1963 and No. 24526/1968) may be mentioned. However, these methods had problems that the mechanical properties and the transparency deteriorated, although the impact resistance was improved. Further, as a method for obtaining a polypropylene composition having good transparency and impact resistance, a method has been disclosed wherein a certain specific ethylene/α-olefin is added to a polypropylene (Japanese Unexamined Patent Publication No. 72744/1977).

Also recently, a method has been disclosed to improve the impact resistance and the transparency by adding a small amount of an ethylene/α-olefin elastomer obtained from a metallocene type compound to a polypropylene (Japanese Unexamined Patent Publications No. 121709/1987, No. 192500/1994 and No. 339920/1994). However, the compositions obtained by these methods had a problem that whitening occurred when an impact was exerted, whereby the product value was impaired, although they were excellent in the impact resistance, transparency and resistance against low temperature brittleness. Further, when flexibility is required, it is necessary to increase the proportion of the ethylene/α-olefin elastomer to be blended. However, the polypropylene and the ethylene/α-olefin elastomer have poor compatibility, and the resulting resin composition has a problem that it is inferior in the transparency, mechanical strength or resistance against whitening on impact, and such a resin composition has been inadequate with respect to the impact resistance, flexibility, transparency, whitening resistance and mechanical strength.

A further improvement of cold resistance is desired to meet the requirement for use in cold areas, and the demand to lower the glass transition temperature of PP is very high. The present invention has been made to solve the above problems, and it is an object of the present invention to provide a polypropylene resin composition excellent in cold resistance and resistance against whitening upon impact, and a molded product thereof.

The present inventors have conducted extensive studies to accomplish the above objects and as a result, have completed the present invention.

That is, the present invention provides a polypropylene resin composition comprising from 5 to 99.9 wt % of a polypropylene resin (A) and from 95 to 0.1 wt % of an ethylene/α-olefin copolymer elastomer (B) satisfying the following conditions (a) to (d):

(a) the α-olefin has a carbon Number of from 4 to 20,
(b) the α-olefin content is larger than 65 wt % and at most 95 wt %,
(c) the density at 23° C. is less than 0.88 g/cm$^3$, and
(d) no peak of crystal fusion is observed by a DSC method; and
a molded product thereof.

Now, the present invention will be described in detail with reference to the preferred embodiments.

The polypropylene resin (A) to be used in the present invention may be the one which is commonly employed. For example, it may be a propylene homopolymer, a propylene/ethylene block copolymer having an ethylene content of from 20 to 70 wt %, a propylene/ethylene random copolymer having an ethylene content of from 0.5 to 12 wt %, or a propylene/ethylene/α-olefin three component copolymer having an ethylene content of from 0.5 to 12 wt % and a content of an α-olefin such as butene-1 of from 0.5 to 20 wt %. Otherwise, a crystalline polypropylene resin wherein the stereoregularity of propylene is syngeotactic, may be used.

The α-olefin of the ethylene/α-olefin copolymer elastomer (B) to be used in the present invention, is the one having a carbon number of from 4 to 20. It may, for example, be butene-1, pentene-1, hexene-1, 4-methyl-pentene-1, heptene-1, octene-1, nonene-1, decene-1, undecene-1, dodecene-1, tridecene-1, tetradecene-1, pentadecene-1, hexadecene-1, heptadecene-1, octadecene-1, nonadecene-1 or eicodecene-1. These α-olefins may be used alone or in combination as a mixture of two or more of them. Among them, butene-1, heptene-1, hexene-1 and octene-1 are, for example, preferred, since they are readily available and the ethylene/α-olefin copolymer elastomer (B) will have excellent compatibility with polypropylene.

The α-olefin content of the ethylene/α-olefin copolymer elastomer (B) to be used in the present invention, is larger than 65 wt % and at most 95 wt %, preferably from 70 to 90 wt %. If the α-olefin content is 65 wt % or less, the compatibility with the polypropylene resin (A) tends to be poor, and the effect for improving the whitening resistance tends to be small. On the other hand, if the α-olefin content exceeds 95 wt %, the glass transition temperature of the ethylene/α-olefin copolymer elastomer itself tends to increase, whereby the effect for improving the cold resistance of the resin composition tends to be poor. When the α-olefin is used in the preferred range, a material excellent in the balance of the whitening resistance and the cold resistance can be obtained.

The density of the ethylene/α-olefin copolymer elastomer (B) to be used in the present invention is less than 0.88 g/cm$^3$ at 23° C. With the ethylene/α-olefin copolymer having a density of at least 0.88 g/cm$^3$, the effect for improving the whitening resistance tends to be poor, and it tends to be difficult to obtain the resin composition of the present invention.

The ethylene/α-olefin copolymer elastomer (B) to be used in the present invention, is characterized in that no peak of crystal fusion is observed by a DSC method. If an ethylene/α-olefin copolymer showing a peak of crystal fusion, is employed, the effect for improving the whitening resistance tends to be poor, whereby it tends to be difficult to obtain the resin composition of the present invention.

The molecular weight of the ethylene/α-olefin copolymer elastomer (B) to be used in the present invention, is not particularly limited. However, the number average molecular weight measured by gel permeation chromatography (GPC) is preferably from 5,000 to 1,000,000, more preferably from 10,000 to 600,000, as calculated as polyethylene. If this number average molecular weight is less than 5,000, the effects for improving the properties of the composition of the present invention tend to be small, and a problem of stickiness of the surface is likely to result. On the other hand, if the number average molecular weight exceeds 1,000,000, the fluidity of the resulting composition tends to be low, whereby the molding is likely to be difficult.

The molecular weight distribution (Mw/Mn) of the ethylene/α-olefin copolymer elastomer to be used in the present invention is not particularly limited, but it is preferably at most 3. It is generally known that as the molecular weight distribution becomes large, the compositional distribution tends to be large. If the compositional distribution is wide, the compatibility of the ethylene/α-olefin copolymer elastomer with the polypropylene resin tends to be poor, whereby it tends to be difficult to obtain the resin composition of the present invention. As an index of the compositional distribution, the ratio of the average α-olefin content (mol %) in a low molecular weight fraction of 10% to the average α-olefin content (mol %) in a high molecular weight fraction of 10% fractionated by GPC, is employed. The ratio of the two is preferably from 0.8 to 1.2, more preferably from 0.9 to 1.15.

A method for producing the above mentioned ethylene/α-olefin copolymer elastomer is not particularly limited, and it can be produced by using various catalysts such as a titanium type catalyst, a vanadium type catalyst or a metallocene type catalyst. Among them, it is preferred to employ a metallocene type catalyst, since it is thereby readily possible to obtain an ethylene/α-olefin copolymer elastomer which satisfies above mentioned molecular weight, molecular weight distribution and compositional distribution.

Namely, the ethylene/α-olefin copolymer elastomer can be produced by copolymerizing ethylene with an α-olefin in the presence of a catalyst which comprises (a) a transition metal compound containing a transition metal of Group 4 of the periodic table, (b) a compound capable of forming an ionic complex by a reaction therewith, and if necessary (c) an organic metal compound.

(a) The transition metal compound containing a transition metal of Group 4 of the periodic table to be used in the present invention, may, for example, be a transition metal compound of Group 4 of the periodic table represented by the following formula (1) or (2):

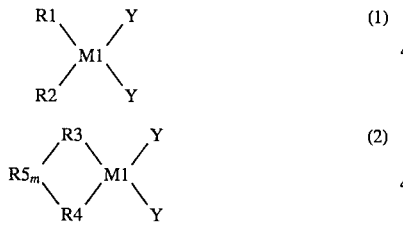

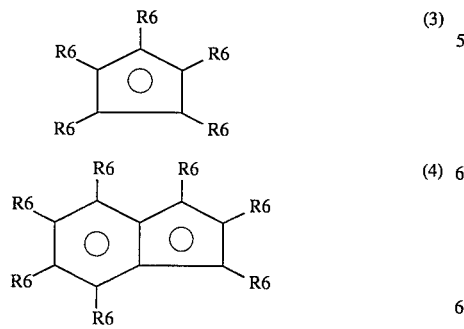

wherein M1 is a titanium atom, a zirconium atom or a hafnium atom, each of the plurality of Y which are independent of one another, is a hydrogen atom, a halogen atom, a $C_{1-24}$ alkyl group or a $C_{6-24}$ aryl, arylalkyl or alkylaryl group, each of R1 and R2 which are independent of each other, is a ligand of the following formula (3), (4), (5) or (6):

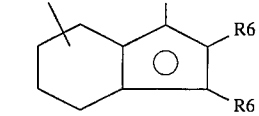

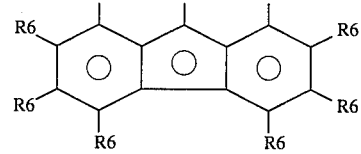

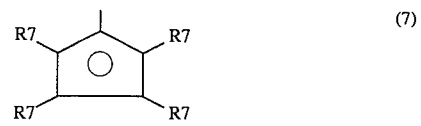

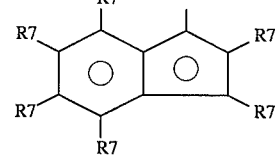

wherein each of the plurality of R6 which are independent of one another, is a hydrogen atom, a $C_{1-24}$ alkyl group or a $C_{6-24}$ aryl, arylalkyl or alkylaryl group, such ligands together with M1 form a sandwich structure, each of R3 and R4 which are independent of each other, is a ligand of the following formula (7), (8), (9) or (10):

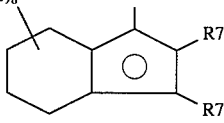

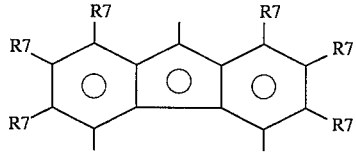

wherein each of the plurality of R7 which are independent of one another, is a hydrogen atom, a $C_{1-24}$ alkyl group or a $C_{6-24}$ aryl, arylalkyl or alkylaryl group, such ligands together with M1 form a sandwich structure, R5 is a group of the following formula (11) or (12):

$$\begin{array}{c} R8 \\ | \\ -C- \\ | \\ R8 \end{array} \quad (11)$$

$$\begin{array}{c} R8 \\ | \\ -M2- \\ | \\ R8 \end{array} \quad (12)$$

wherein each of the plurality of R8 which are independent of one another, is a hydrogen atom, a $C_{1-24}$ alkyl group or a $C_{6-24}$ aryl, arylalkyl or alkylaryl group, and M2 is a silicon atom, a germanium atom or a tin atom, and such a group serves to crosslink R3 and R4, and m is an integer of from 1 to 5; or a transition metal compound of Group 4 of the periodic table represented by the following formula (13), (14), (15) or (16):

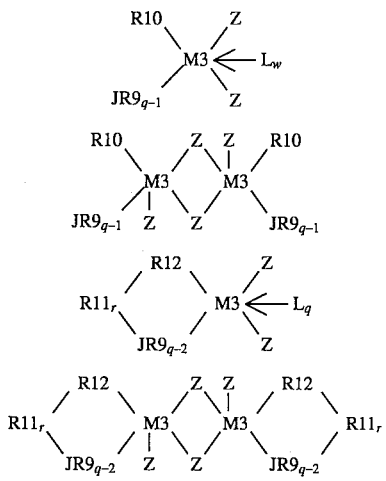

(13)

(14)

(15)

(16)

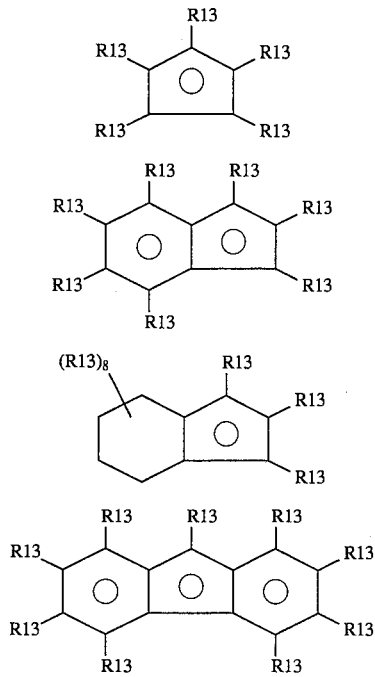

(17)

(18)

(19)

(20)

wherein each of the plurality of M3 which are independent of one another, is a titanium atom, a zirconium atom or a hafnium atom, each of the plurality of Z which are independent of one another is a hydrogen atom, a halogen atom, a $C_{1-24}$ alkyl group or a $C_{6-24}$ aryl, arylalkyl or alkylaryl group, L is a Lewis base, w is $0 \leq w \leq 3$, each of $JR9_{q-1}$ and $JR9_{q-2}$ is a hetero-atom ligand, J is a Group 15 element with a coordination number being 3 or a Group 16 element with a coordination number being 2, each of the plurality of R9 which are independent of one another, is a hydrogen atom, a halogen atom, a $C_{1-24}$ alkyl or alkoxy group, or a $C_{6-24}$ aryl, aryloxy, arylalkyl, arylalkoxy, alkylaryl or alkylaryloxy group, q is a coordination number of element J, R10 is a ligand of the following formula (17), (18), (19) or (20):

wherein each of the plurality of R13 which are independent of one another, is a hydrogen atom, a $C_{1-24}$ alkyl group or a $C_{6-24}$ aryl, arylalkyl or alkylaryl group, R12 is a ligand coordinated to M3 and represented by the following formula (21), (22), (23) or (24)

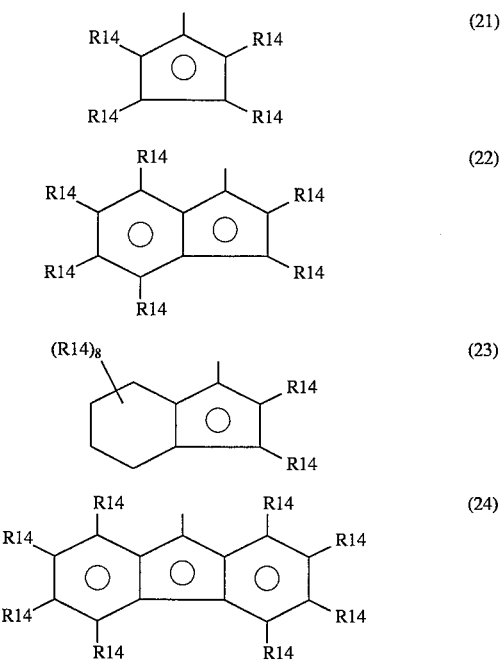

(21)

(22)

(23)

(24)

wherein each of the plurality of R14 which are independent of one another, is a hydrogen atom, a $C_{1-24}$ alkyl group or a $C_{6-24}$ aryl, arylalkyl or alkylaryl group, R11 is a group of the following formula (25) or (26):

(25)

(26)

Wherein each of R15 which are independent of one another, is a hydrogen atom, a $C_{1-24}$ alkyl group or a $C_{6-24}$ aryl, arylalkyl or alkylaryl group, and M4 is a silicon atom, a germanium atom or a tin atom, and R11 serves to crosslink R12 and $JR9_{q-2}$, and r is integer of from 1 to 5.

The compound of the above formula (1) or (2) may, for example, be a dichloro derivative such as bis(cyclopentadienyl)titanium dichloride, bis(cyclopentadienyl)zirconium dichloride, bis(cyclopentadienyl)hafnium dichloride, bis(methylcyclopentadienyl)titanium dichloride, bis(methylcyclopentadienyl)zirconium dichloride, bis(methylcyclopentadienyl)hafnium dichloride, bis(butylcyclopentadienyl)titanium dichloride, bis(butylcyclopentadienyl)zirconium dichloride, bis(butylcyclopentadienyl)hafnium dichloride, bis(pentamethylcyclopentadienyl)titanium dichloride, bis(pentamethylcyclopentadienyl)zirconium dichloride, bis(pentamethylcyclopentadienyl)hafnium dichloride, bis-(indenyl)titanium dichloride, bis(indenyl)zirconium dichloride, bis(indenyl)hafnium dichloride, methylenebis(cyclopentadienyl)titanium dichloride, methylenebis(cyclopentadienyl)zirconium dichloride, methylenebis(cyclopentadienyl)hafnium dichloride, methylenebis(methylcyclopentadienyl)titanium dichloride, methylenebis(methylcyclopentadienyl)zirconium dichloride, methylenebis(methylcyclopentadienyl)hafnium dichloride, methylenebis(butylcyclopentadienyl)titanium dichloride, methylenebis(butylcyclopentadienyl)hafnium dichloride, methylenebis(tetramethylcyclopentadienyl)titanium dichloride, methylenebis(tetramethylcyclopentadienyl)zirconium dichloride, methylenebis(tetramethylcyclopentadienyl)hafnium dichloride, ethylenebis(indenyl)titanium dichloride, ethylenebis(indenyl)zirconium dichloride, ethylenebis(indenyl)hafnium dichloride, ethylenebis(tetrahydroindenyl)titanium dichloride, ethylenebis(tetrahydroindenyl)zirconium dichloride, ethylenebis(tetrahydroindenyl)hafnium dichloride, ethylenebis(2-methyl-1-indenyl)titanium dichloride, ethylenebis(2-methyl-1-indenyl)zirconium dichloride, ethylenebis(2-methyl-1-indenyl)hafnium dichloride, isopropyliaene(cyclopentadienyl-9-fluorenyl)titanium dichloride, isopropylidene(cyclopentadienyl-9-fluorenyl)zirconium dichloride, isopropylidene(cyclopentadienyl-9-fluorenyl)hafnium dichloride, isopropylidene(cyclopentadienyl-2, 7-dimethyl-9-fluorenyl)titanium dichloride, isopropylidene(cyclopentadienyl-2, 7-dimethyl-9-fluorenyl)zirconium dichloride, isopropylidene(cyclopentadienyl-2, 7-dimethyl-9-fluorenyl)hafnium dichloride, isopropylidene(cyclopentadienyl-2, 7-di-t-butyl-9-fluorenyl)titanium dichloride, isopropylidene(cyclopentadienyl-2, 7-di-t-butyl-9-fluorenyl)zirconium dichloride, isopropylidene(cyclopentadienyl-2, 7-di-t-butyl-9-fluorenyl)hafnium dichloride, diphenylmethylene(cyclopentadienyl-9-fluorenyl)titanium dichloride, diphenylmethylene(cyclopentadienyl-9-fluorenyl)zirconium dichloride, diphenylmethylene(cyclopentadienyl-9-fluorenyl)hafnium dichloride, diphenylmethylene(cyclopentadienyl-2, 7-dimethyl-9-fluorenyl)titanium dichloride, diphenylmethylene(cyclopentadienyl-2, 7-dimethyl-9-fluorenyl)zirconium dichloride, diphenylmethylene(cyclopentadienyl-2, 7-dimethyl-9-fluorenyl)hafnium dichloride, diphenylmethylene(cyclopentadienyl-2, 7-di-t-butyl-9-fluorenyl)titanium dichloride, diphenylmethylene(cyclopentadienyl-2, 7-di-t-butyl-9-fluorenyl)zirconium dichloride, diphenylmethylene(cyclopentadienyl-2, 7-di-t-butyl-9-fluorenyl)hafnium dichloride, dimethylsilanediyl bis(cyclopentadienyl)titanium dichloride, dimethylsilanediyl bis(cyclopentadienyl)zirconium dichloride, dimethylsilanediyl bis(cyclopentadienyl)hafnium dichloride, dimethylsilanediyl bis(methylcyclopentadienyl)titanium dichloride, dimethylsilanediyl bis(methylcyclopentadienyl)zirconium dichloride, dimethylsilanediyl bis(methylcyclopentadienyl)hafnium dichloride, dimethylsilanediyl bis(butylcyclopentadienyl)titanium dichloride, dimethylsilanediyl bis(butylcyclopentadienyl)zirconium dichloride, dimethylsilanediyl bis(butylcyclopentadienyl)hafnium dichloride, dimethylsilanediyl bis(2,4,5-trimethylcyclopentadienyl)titanium dichloride, dimethylsilanediyl bis(2,4-dimethylcyclopentadienyl)titanium dichloride, dimethylsilanediyl bis(3-methylcyclopentadienyl)titanium dichloride, dimethylsilanediyl bis(4-t-butyl-2-methylcyclopentadienyl)titanium dichloride, dimethylsilanediyl bis(tetramethylcyclopentadienyl)titanium dichloride, dimethylsilanediyl bis(indenyl)titanium dichloride, dimethylsilanediyl bis(2-methyl-indenyl)titanium dichloride, dimethylsilanediyl bis(tetrahydroindenyl)titanium dichloride, dimethylsilanediyl(cyclopentadienyl-9-fluorenyl)titanium dichloride, dimethylsilanediyl(cyclopentadienyl-2,7-dimethyl-9-fluorenyl)titanium dichloride, dimethylsilanediyl (cyclopentadienyl-2,7-di-t-butyl-9-fluorenyl)titanium dichloride, dimethylsilanediyl bis(2,4,5-trimethylcyclopentadienyl)zirconium dichloride, dimethylsilanediyl bis(2,4-dimethylcyclopentadienyl)zirconium dichloride, dimethylsilanediyl bis(3-methylcyclopentadienyl)zirconium dichloride, dimethylsilanediyl bis(4-t-butyl-2-methylcyclopentadienyl)zirconium dichloride, dimethylsilanediyl bis(tetramethylcyclopentadienyl)zirconium dichloride, dimethylsilanediyl bis(indenyl)zirconium dichloride, dimethylsilanediyl bis(2-methyl-indenyl)zirconium dichloride, dimethylsilanediyl bis(tetrahydroindenyl)zirconium dichloride, dimethylsilanediyl(cyclopentadienyl-9-fluorenyl)zirconium dichloride, dimethylsilanediyl(cyclopentadienyl-2,7-dimethyl-9-fluorenyl)zirconium dichloride, dimethylsilanediyl(cyclopentadienyl-2,7-di-t-butyl-9-fluorenyl)zirconium dichloride, dimethylsilanediyl bis(2,4,5-trimethylcyclopentadienyl)hafnium dichloride, dimethylsilanediyl bis(2,4-demethylcyclopentadienyl)hafnium dichloride, dimethylsilanediyl bis(3-methylcyclopentadienyl)hafnium dichloride, dimethylsilanediyl bis(4-t-butyl-2-methylcyclopentadienyl)hafnium dichloride, dimethylsilanediyl bis(tetramethylcyclopentadienyl)hafnium dichloride, dimethylsilanediyl bis(indenyl)hafnium dichloride, dimethylsilanediyl bis(2-methyl-indenyl)hafnium dichloride, dimethylsilanediyl bis(tetrahydroindenyl)hafnium dichloride, dimethylsilanediyl bis(indenyl)hafnium dichloride, dimethylsilanediyl bis(2-methyl-indenyl)hafnium dichloride, dimethylsilanediyl bis(tetrahydroindenyl)hafnium dichloride, dimethylsilanediyl bis(cyclopentadienyl-9-fluorenyl)hafnium dichloride, dimethylsilanediyl(cyclopentadienyl-2,7-dimethyl-9-fluorenyl)hafnium dichloride, dimethylsilanediyl (cyclopentadienyl-2,7-di-t-butyl-9-fluorenyl)hafnium dichloride, diethylsilanediyl bis(2,4,5-trimethylcyclopentadienyl)titanium dichloride, diethylsilanediyl bis(2,4-dimethylcyclopentadienyl)titanium dichloride, diethylsilanediyl bis(3-methylcyclopentadienyl)titanium dichloride, diethylsilanediyl bis(4-t-butyl-2-methylcyclopentadienyl)titanium dichloride, diethylsilanediyl bis(tetramethylcyclopentadienyl)titanium dichloride, diethylsilanediyl bis(indenyl)titanium dichloride, diethylsilanediyl bis(2-methyl-indenyl)titanium dichloride, diethylsilanediyl bis(tetrahydroindenyl)titanium dichloride, diethylsilanediyl(cyclopentadienyl-9-fluorenyl)titanium dichloride, diethylsilanediyl(cyclopentadienyl-2,7-dimethyl-9-fluorenyl)titanium dichloride, diethylsilanediyl(cyclopentadienyl-2,7-di-t-butyl-9-fluorenyl)titanium dichloride, diethylsilanediyl bis(2,4,5-trimethylcyclopentadienyl)zirconium dichloride, diethylsilanediyl bis(2,4-dimethylcyclopentadienyl)zirconium dichloride, diethylsilanediyl bis(3-methylcyclopentadienyl)zirconium dichloride, diethylsilanediyl bis(4-t-butyl-2-methylcyclopentadienyl)zirconium dichloride, diethylsilanediyl bis(tetramethylcyclopentadienyl)zirconium dichloride, diethylsilanediyl bis(indenyl)zirconium dichloride, diethylsilanediyl bis(2-methyl-indenyl)zirconium dichloride, diethylsilanediyl bis(tetrahydroindenyl)zirconium dichloride, diethylsilanediyl(cyclopentadienyl-9-fluorenyl)zirconium dichloride, diethylsilanediyl bis(cyclopentadienyl-2,7-dimethyl-9-fluorenyl)zirconium dichloride, diethylsilanediyl bis(cyclopentadienyl-2,7-di-t-butyl-9-fluorenyl)zirconium dichloride, diethylsilanediyl bis(2,4,5-trimethylcyclopentadienyl)hafnium dichloride, diethylsilanediyl bis(3-methylcyclopentadienyl)hafnium dichloride, diethylsilanediyl bis(4-t-butyl-2-methylcyclopentadienyl)hafnium dichloride, diethylsilanediylbis(tetramethylcyclopentadienyl)hafnium dichloride, diethylsilanediyl bis(indenyl)hafnium dichloride, diethylsilanediyl bis( 2-methylindenyl)hafnium dichloride, diethylsilanediyl bis(tetrahydroindenyl)hafnium dichloride, diethylsilanediyl(cyclopentadienyl-9-fluorenyl)hafnium dichloride, diethylsilanediyl(cyclopentadienyl-2, 7-dimethyl-9-fluorenyl)hafnium dichloride, diethylsilanediyl bis(cyclopentadienyl-2,7-di-t-buthyl-9-fluorenyl)hafnium dichloride, diphenylsilanediyl bis(2,4,5-trimethylcyclopentadienyl)titanium dichloride, diphenylsilanediyl bis(2,4-dimethylcyclopentadienyl)titanium dichloride, diphenylsilanediyl bis(3-methylcyclopentadienyl)titanium dichloride, diphenylsilanediyl bis(4-t-butyl-2-methylcyclopentadienyl)titanium dichloride, diphenylsilanediyl bis(tetramethylcyclopentadienyl)titanium dichloride, diphenylsilanediyl bis(indenyl)titanium dichloride, diphenylsilanediyl bis(2-methyl-indenyl)titanium dichloride, diphenylsilanediyl bis(tetrahydroindenyl)titanium dichloride, diphenylsilanediyl bis(cyclopentadienyl-9-fluorenyl)titanium dichloride, diphenylsilanediyl(cyclopentadienyl-2,7-dimethyl-9-fluorenyl)titanium dichloride, diphenylsilanediyl(cyclopentadienyl-2,7-di-t-butyl-9-fluorenyl)titanium dichloride, diphenylsilanediyl bis(2,4,5-trimethylcyclopentadienyl)zirconium dichloride, diphenylsilanediyl bis(2,4-dimethylcyclopentadienyl)zirconium dichloride, diphenylsilanediyl bis(3-methylcyclopentadienyl)zirconium dichloride, diphenylsilanediyl bis(4-t-butyl-2-methylcyclopentadienyl)zirconium dichloride, diphenylsilanediyl bis(tetramethylcyclopentadienyl)zirconium dichloride, diphenylsilanediyl bis(indenyl)zirconium dichloride, diphenylsilanediyl bis(2-methyl-indenyl)zirconium dichloride, diphenylsilanediyl bis(tetrahydroindenyl)zirconium dichloride, diphenylsilanediyl(cyclopentadienyl-9-fluorenyl)zirconium dichloride, diphenylsilanediyl(cyclopentadienyl-2,7-dimethyl-9-fluorenyl)zirconium dichloride, diphenylsilanediyl(cyclopentadienyl-2,7-di-t-butyl-9-fluorenyl)zirconium dichloride, diphenylsilanediyl bis(2,4,5-trimethylcyclopentadienyl)hafnium dichloride, diphenylsilanediyl bis(3-methylcyclopentadienyl)hafnium dichloride, diphenylsilanediyl bis(4-t-butyl-2-methylcyclopentadienyl)hafnium dichloride, diphenylsilanediyl bis(tetramethylcyclopentadienyl)hafnium dichloride, diphenylsilanediyl bis(indenyl)hafnium dichloride, diphenylsilanediyl bis(2-methyl-indenyl)hafnium dichloride, diphenylsilanediyl bis(tetrahydroindenyl)hafnium dichloride, diphenylsilanediyl(cyclopentadienyl-9-fluorenyl)hafnium dichloride, diphenylsilanediyl(cyclopentadienyl-2,7-dimethyl-9-fluorenyl)hafnium dichloride, or diphenylsilanediyl(cyclopentadienyl-2,7-di-t-butyl-9-fluorenyl)hafnium dichloride, or a dimethyl derivative, diethyl derivative, dihydro derivative, diphenyl derivative or dibenzyl derivative of such a Group 4 transition metal compound.

The compound of the above formula (13), (14), (15) or (16) may, for example, be a dichloro derivative such as pentamethylcyclopentadienyl-di-t-butylphosphinotitanium dichloride, pentamethylcyclopentadienyl-di-t-butylamidotitanium dichloride, pentamethylcyclopentadienyl-n-butoxyamidotitanium dichloride, pentamethylcyclopentadienyl-di-t-butylphosphinozirconium dichloride, pentamethylcyclopentadienyl-di-t-butylamidozirconium dichloride, pentamethylcyclopentadienyl-n-butoxyamidozirconium dichloride, pentamethylcyclopentadienyl-di-t-butylphosphinohafunium dichloride, pentamethylcyclopentadienyl-di-t-butylamidohafunium dichloride, pentamethylcyclopentadienyl-n-butoxyamidohafunium dichloride, (t-butylamido)dimethyl(tetramethyl-η5-cyclopentadienyl)silanetitanium dichloride, dimethyl(phenylamido)(tetramethyl-η5-cyclopentadienyl)silanetitanium dichloride, (t-butylamido)methylphenyl(tetramethyl-η5-cyclopentadienyl)silanetitanium dichloride, (p-n-butylphenylamido)dimethyl(tetramethyl-η5-cyclopentadienyl)silanetitanium dichloride, dimethyl(p-methoxyphenylamido)(tetramethyl-η5-cyclopentadienyl)silanetitanium dichloride, (t-butyl-η5-cyclopentadienyl)(2,5-di-t-butyl- phenylamido)dimethylsilanetitanium dichloride, (t-butylamido)dimethyl(η5-indenyl)silane titanium dichloride, (cyclohexylamido)dimethyl(tetramethyl-η5-cyclopentadienyl)silanetitanium dichloride, (cyclohexylamido)dimethyl(fluorenyl)silanetitanium dichloride, (cyclododecylamido)dimethyl(tetramethyl-η5-cyclopentadienyl)silanetitanium dichloride, (t-butylamido)dimethyl(tetramethyl-η-cyclopentadienyl)silanezirconium dichloride, (t-butylamido)(t-butyl-η5-cyclopentadienyl)dimethylsilane zirconium dichloride, (t-butylamido)dimethyl(trimethyl-η5-cyclopentadienyl)silanezirconium dichloride, dimethyl(phenylamido)(tetramethyl-η5-cyclopentadienyl)silanezirconium dichloride, (t-butylamido)methylphenyl(tetramethyl-η5-cyclopentadienyl)silanezirconium dichloride, (p-n-butylphenylamido)dimethyl(tetramethyl-η5-cyclopentadienyl)silanezirconium dichloride, dimethyl(p-methoxyphenylamido)(tetramethyl-η5-cyclopentadienyl)silanezirconium dichloride, (t-butyl-η5-cyclopentadienyl)(2,5-di-t-butylphenylamido)dimethylsilanezirconium dichloride, (t-butylamido)dimethyl(η5-indenyl)silanezirconium dichloride, (cyclohexylamido)dimethyl(tetramethyl-η5-cyclopentadienyl)silanezirconium dichloride, (cyclohexylamido)dimethyl(fluorenyl)silanezirconium dichloride, (cyclododecylamido)dimethyl(tetramethyl-η5-cyclopentadienyl)silanezirconium dichloride, (t-butylamido)dimethyl(tetramethyl-η5-cyclopentadienyl)silanehafnium dichloride, (t-butylamido)(t-butyl-η5-cyclopentadienyl)dimethylsilanehafnium dichloride, (t-butylamido)dimethyl(trimethyl-η5-cyclopentadienyl)silanehafnium dichloride, dimethyl(phenylamido)(tetramethyl-η5-cyclopentadienyl)silanehafnium dichloride, (t-butylamido)methylphenyl(tetramethyl-η5-cyclopentadienyl)silanehafnium dichloride, (p-n-butylphenylamido)dimethyl(tetramethyl-η5-cyclopentadienyl)silanehafnium dichloride, dimethyl(p-methoxyphenylamido)(tetramethyl-η5-cyclopentadienyl)silanehafnium dichloride, (t-butyl-η5-cyclopentadienyl)(2,5-di-t-butylphenylamido)dimethylsilane hafnium dichloride, (t-butylamido)dimethyl(η5-indenyl)silanehafnium dichloride, (cyclohexylamido)dimethyl(tetramethyl-η5-cyclopentadienyl)silanehafnium dichloride, (cyclohexylamido)dimethyl(fluorenyl)silanehafnium dichloride, or (cyclododecylamido)dimethyl(tetramethyl-η5-cyclopentadienyl)silanehafnium dichloride, or a dimethyl derivative, diethyl derivative, dihydro derivative, diphenyl derivative or dibenzyl derivative of such a Group 4 transition metal compound.

Further, the compound (b) capable of forming an ionic complex by a reaction with the above organic transition metal compound (a), may be any compound so long as it is capable of forming an ionic complex. It is particularly preferred to employ an ionized ionic compound of the formula (27) having a bulky anion having a non-coordinating property.

$$[C^+][A^-] \quad (27)$$

In the above formula (27), [$C^+$] is a cation. Specifically, it is a cation containing an active proton, such as a proton itself or a Brønsted acid represented by e.g. trimethylammonium, triethylammonium, tripropylammonium, tributylammonium, N,N-dimethylanilinium, N,N-diethylanilinium, triphenylphosphonium, tri(o-tolyl)phosphonium, tri(p-tolyl)phosphonium or tri(mesityl)phosphonium, or a carbonium, oxonium or sulfonium cation containing no active proton, specifically a compound represented by e.g. triphenylcarbenium, tropylium ion, trimethyloxonium, triethyloxonium or triphenyloxonium, or a metal atom or an organometal cation such as a lithium ion, a magnesium ion, a palladium ion, a platinum ion, a copper ion, a silver ion, a gold ion, a mercury ion as well as an etherate compound having a base such as an ether coordinated thereto, a ferrocenium ion or a dimethylferrocenium ion. However the cation is not limited to such specific examples.

[A$^-$] is an anion, and it is not particularly limited. An anion capable of weekly coordinating to the above organic transition metal compound component (a) without a reaction, may be used. For example, it may preferably be a bulky and non-nucleophilic anion containing a metal such as magnesium or aluminum having an electric charge, or a non-metal such as a halogen, boron or phosphorus. Specifically, it may be an anion represented by [AlR$_4^-$], [BR$_4^-$], [PR$_6^-$] or [ClO$_4^-$]. More specifically, it may, for example, be tetraphenyl borate, tetra(pentafluorophenyl) borate, tetra(o-fluorophenyl) borate, tetra(p-fluorophenyl) borate, tetra(m-fluorophenyl) borate, tetra(m,m-difluorophenyl) borate, tetra(o,m-difluorophenyl) borate, tetra(o,o-difluorophenyl) borate, tetra(o-tolyl) borate, tetra(p-tolyl) borate, tetra(2,5-dimethylphenyl) borate, tetra(1,5-dimethylphenyl) borate, tetraphenyl aluminate, tetra(pentafluorophenyl) aluminate, tetra(o-fluorophenyl) aluminate, tetra(p-fluorophenyl) aluminate, tetra(m-fluorophenyl) aluminate, tetra(m,m-difluorophenyl) aluminate, tetra(o,m-difluorophenyl) aluminate, tetra(o,o-difluorophenyl) aluminate, tetra(o-tolyl) aluminate, tetra(p-tolyl) aluminate, tetra(m,m-dimethylphenyl) aluminate, tetra(o,m-dimethylphenyl) aluminate, octadeca borate, dodeca borate, 1-carbaundeca borate, or 1-carbadodeca borate. However, the useful anion is not limited to such specific examples.

The ionized ionic compound may, for example, lithiumtetrakispentafluorophenyl borate, aniliniumtetrakispentaflouorophenyl borate, triphenylcarbeniumtetrakispentaflouorophenyl borate, tropiniumtetrakispentaflouorophenyl borate, lithiumtetrakispentafluorophenyl aluminate, aniliniumtetrakispentaflouorophenyl aluminate, triphenylcarbeniumtetrakiapentaflouorophenyl aluminate, or tropiniumtetrakispentafluorophenyl aluminate. However, it is not limited to such specific examples.

Further, as an example of the compound component (b), a compound having a bond of aluminum and oxygen may be mentioned. As a specific example, an aluminoxane of the following formula (28) or (29):

   (28)

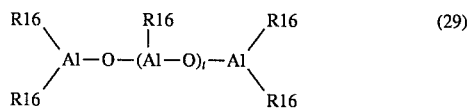   (29)

wherein each of the plurality of R16 which are independent of one another, is a hydrogen atom, a halogen atom, a $C_{1-24}$ alkyl or alkoxy group, or a $C_{6-24}$ aryl, aryloxy, arylalkyl, arylalkoxy, alkylaryl or alkyl aryloxy group, provided that at least one R16 is a hydrogen atom, a $C_{1-24}$ alkyl group or a $C_{6-24}$ aryl, arylalkyl or alkylaryl, and t is an integer of from 0 to 100, may be mentioned. As a specific example of R16, chlorine, bromine, iodine, a methoxy group, an ethoxy group, a propoxy group, a butoxy group, a phenoxy group, a methyl group, an ethyl group, a propyl group, a butyl group, a hexyl group, a phenyl group, a benzyl group, a tolyl group, or cyclohexyl group may be mentioned.

A process for producing a compound this type is known. For example, (1) a method of adding and reacting a trialkylaluminum to a suspension in a hydrocarbon medium of a compound having adsorbed water or a salt containing water of crystallization (such as magnesium sulfate hydrate, copper sulfate hydrate or aluminum sulfate hydrate), or (2) a method of reacting a trialkyl aluminum directly with water in a hydrocarbon medium, may be mentioned.

In the foregoing, the compound (b) which is capable of reacting with the organic transition metal compound (a) to form an ionic complex has been exemplified. However, the compound (b) is not particularly limited and may be any compound so long as it is capable of converting the organic transition metal compound (a) to an ionic complex. Further, two or more such compounds may be used in combination.

Further, for the above catalyst, an organometal compound (c) may also be used, as the case requires. As such organic metal compound (c), an organic metal compound of the following formula (30):

$$M5R17_s \qquad (30)$$

wherein M5 is an element of Group 1, 2 or 13 of the periodic table, Sn or Zn, each of the plurality of R17 which are independent of one another, is a hydrogen atom, a $C_{1-24}$ alkyl or alkoxy group, or a $C_{6-24}$ aryl, aryloxy, arylalkyl, arylalkoxy, alkylaryl or alkylaryloxy group, provided that at least one R17 is a hydrogen atom, a $C_{1-24}$ alkyl group or a $C_{6-24}$ aryl, arylalkyl or alkylaryl group, and s corresponds to the oxidation number of M5, may be used.

The compound of the formula (30) may, for example, be an alkyllithium such as methyllithium or butyllithium, an alkylboron such as triethylboron, an alkyl aluminum such as trimethylaluminum, triethylaluminum or triisobutylaluminum, an alkylaluminum halide such as dimethylaluminum fluoride, dimethylaluminum chloride, diethylaluminum chloride or diisobutylaluminum chloride, an alkylaluminum hydride such as diethylaluminum hydride or diisobutylaluminum hydride, an alkylmagnesium such as dibutylmagnesium or butylethylmagnesium, a Grignard compound such as methylmagnesium chloride, methylmagnesium bromide, butylmagnesium chloride or butyl magnesium bromide, a zinc compound such as diethylzinc or diphenylzinc, or a tin compound such as diethyltin or dibutyltin. However, it is not limited such examples. These organic metal compounds (c) may be used alone or in combination as a mixture of two or more of them, depending upon the particular purpose. However, when such a compound is used alone, it is preferably a compound having aluminum.

Here, the ratio of the component (a) to the component (b) is not particularly limited for the preparation of the catalyst. However, the molar ratio of the component (a) to the component (b) is preferably within a range of component (a):component (b)=100:1 to 1:1,000,000, more preferably 1:1 to 1:100,000. A method for preparing a catalyst from these components (a) and (b) is not particularly limited. As an example of the preparation method, a method may be mentioned wherein such components are mixed in a solvent inert to such components, or using the monomer for polymerization, as the solvent. Further, the order of reacting these components is not particularly limited. Likewise, the temperature for the treatment is not particularly limited, and the treating time is also not particularly limited.

The ratio of the component (a) to the component (c) is not particularly limited for the preparation of the catalyst. However, the molar ratio of the component (a) to the component (c) is preferably within a range of component (a):(c)=100:0 to 1:1,000,000, more preferably 1:1 to 1:100,000.

The preparation of the ethylene/α-olefin copolymer elastomer (B) to be used in the present invention can be conducted in a liquid phase. As the solvent to be used for the preparation, any organic solvent which is commonly used, may be employed. Specifically, benzene, toluene, xylene, pentane, hexane, heptane or methylene chloride may, for example, be mentioned. Otherwise, an α-olefin itself may be used as the solvent. In the preparation of the ethylene/α-olefin copolymer elastomer (B) to be used in the present invention using the above mentioned catalyst system, the polymerization temperature is not particularly limited. However, it is usually preferably within a range from −100° to 300° C. Likewise, the polymerization pressure is not particularly limited, but is usually within a range of from atmospheric pressure to 2000 kg/cm$^2$.

The polymerization can be carried out by any one of batch system, semicontinuous system and continuous system. Further, it can be conducted in two or more separate steps changing the polymerization conditions. The copolymer obtained after completion of the polymerization can be separated and recovered from the polymerization solution by a conventional method, followed by drying obtain the copolymer in a solid state.

The resin composition of the present invention comprises the polypropylene resin (A) and the ethylene/α-olefin copolymer elastomer (B). The blend ratio is such that the polypropylene resin (A) is from 5 to 99.9 wt %, and the ethylene/α-olefin copolymer elastomer (B) is from 95 to 0.1 wt %, and it may be optionally changed depending upon the particular purpose and the required physical properties. When the polypropylene resin (A) is from 70 to 99.9 wt %, the composition will be excellent in whitening resistance and in the balance of the rigidity and the low temperature impact resistance, and when the polypropylene resin (A) is from 5 to 70 wt %, the composition will be excellent in the flexibility, transparency, impact resistance and whitening resistance.

If the ethylene/α-olefin copolymer elastomer (B) exceeds 95 wt %, the strength tends to remarkably deteriorate, and a problem of surface stickiness is likely to result. On the other hand, if the ethylene/α-olefin copolymer elastomer (B) is less than 0.1 wt %, the impact resistance or the whitening resistance tends to be poor, such being undesirable.

The resin composition of the present invention is preferably characterized in that the glass transition temperature of the polypropylene phase representing the maximum peak temperature of the tangent loss (tan δ) obtained from the temperature dependency of the dynamic viscoelasticity, is lower by at least 1° C. than the propylene resin (A) alone. By virtue of this characteristic, the composition is excellent in cold resistance and whitening resistance.

The resin composition of the present invention is preferably characterized in that one peak of the loss tangent (tan δ) obtained from the temperature dependency of the dynamic viscoelasticity exists in a temperature range of from −80° C. to 30° C. By virtue of this characteristic, the cold resistance can be improved, and whitening upon impact can be reduced.

Measurement of the dynamic viscoelasticity can be conducted in various modes such as tensile, shearing, compression, twisting or bending. In any case, it is common that the measurement is carried out within a frequency range of from 0.1 to 1,000 Hz.

Further, the resin composition of the present invention is characterized in that preferably, no disperse phase having a size of at least 0.01 μm is present. By virtue of this characteristic, the whitening resistance upon impact of the resin composition of the present invention will be further improved. Observation of the structure can preferably conducted in such a manner that a test specimen exposed to a vapor of ruthenium tetraoxide, is observed by a transmission electron microscope. When other methods are used for structural observation, a due care is necessary since it is some times not possible to detect a slightly phase separated structure.

Further, to the composition of the present invention, an inorganic filler such as calcium carbonate, mica, talc, silica, barium sulfate, calcium sulfate, kaolin, clay, pyroferrite, bentonite, cerisanite, zeolite, nepheline syenite, attapulgite, wollustnite, ferrite, calcium silicate, magnesium carbonate, dolomite, antimony trioxide, zinc oxide, titanium oxide, magnesium oxide, iron oxide, molybdenum disulfide, graphite, gypsum, glass beads, glass powder, glass balloons, quartz or quartz glass, or an organic or inorganic pigment, may further be incorporated, as the case requires. Further, a crystal seed, a clarifier, a release agent, a antistatic agent, a slip agent, a lubricant, a heat resistance stabilizer, a weather resistance stabilizer, a blowing agent, a rust-proofing agent, an ion trap agent, a flame retardant, or a flame retarding adjuvant may be incorporated, as the case requires. Further, the composition of the present invention may be blended to other resins. In a such a case, a compatibilizing agent may be used as a third component to improve the compatibility between the resin composition of the present invention and other resins.

The resin composition of the present invention can be obtained by a conventional method simply by blending the polypropylene resin (A) and the ethylene/α-olefin copolymer elastomer (B). It is preferred to prepare it by melt-blending by means of a kneader, a roll mill, a Bumbury mixer or an extruder. A molded product obtained by molding the polypropylene resin composition of the present invention by a molding method such as injection, compression, extrusion, vacuum, pressure or blow molding, will be excellent not only in the cold resistance but also in the whitening resistance upon impact.

Now, the present invention will be described in further detail with reference to Examples. However, it should be understood that the present invention is by no means restricted to such specific Examples. In the Examples, various measurements were carried out in accordance with the following methods.

Measurement of the α-olefin content in an ethylene/α-olefin copolymer

The $^{13}$C-MNR spectrum (JNM GX 400, manufactured by Nippon DenShi K.K.) measurement was carried out at 100 MHz using o-dichlorobenzene/benzene-d6 (75/25 vol %) as the solvent, and the α-olefin content was calculated in accordance with the following literatures:

Ethylene/propylene copolymer: Macromolecules 15, 1150 (1982)

Ethylene/butene-1 copolymer: Macromolecules 15, 353 (1982)

Ethylene/hexene-1 copolymer: Macromolecules 15, 1402 (1982)

Ethylene/octene-1 copolymer: polymer 25, 441 (1984)

Measurement of the molecular weight and the molecular weight distribution

By means of gel permeation chromatography (150C model GPC, manufactured by Millipore K.K.) at 140° C. using o-dichlorobenzene as the solvent, the molecular weight and the molecular weight distribution were determined as calculated as polyethylene.

Measurement of the dynamic viscoelasticity

By means of a dynamic viscoelasticity measuring apparatus DVE V-4 (manufactured by Rheology Company) which is a measuring apparatus based on non-resonance type forced oscillation, the temperature dependency of the loss tangent (tan δ) was measured at a temperature raising rate of 2° C./min in a temperature range of from −80° to 30° C. in a tensile mode at a measurement frequency of 10 Hz. The test specimen was prepared by cutting out a specimen of 5 mm×30 mm from a sheet having a thickness of 1 mm. The measurement was carried out in a linear region with an exerted strain of not more than 0.1%. The peak temperature of tan δ observed in this measurement was designated as (T-B). In a case where a plurality of peaks were observed, the peak temperature on the higher temperature side corresponding to the glass transition temperature of the polypropylene resin, was taken as (T-B). Separately, with respect to a sample prepared by molding the polypropylene resin alone, the same measurement was carried out to obtain the temperature (T-PP) at which tan δ showed a peak. The temperature obtained by subtracting (T-B) from (T-PP) was taken as a shift temperature of the glass transition temperature of the polypropylene resin, which was used as an index for the improvement of the cold resistance. Further, the number of peaks was obtained.

Observation of the phase structure

Using a transmission electron microscope JEOL JEM-2000FX(TEM), the phase structure was observed with 5000 magnifications at an accelerated voltage of 200 kV. The sample was prepared by cutting a sheet having a thickness of 1 mm into a superthin specimen of 0.1 µm by an ultramicrotome in an atmosphere of −100° C., and the specimen was exposed to a vapor of osmium tetraoxide for dyeing, whereupon it was used for observation. The obtained photograph was subjected to image treatment to obtain an average particle size. However, those having average particle sizes less than 0.01 µm were not counted.

Izod impact test

In accordance with JIS K7110, the izod impact test was carried out using a molded product having a thickness of 3.2 mm at a measurement temperature of 23° C.

Tensile test

In accordance with JIS K7113, the tensile strength was measured using a molded product having a thickness of 1 mm at a tensile speed of 50 mm/min.

Impact whitening test

Method A: from a height of 80 cm, an impactor having a load of 1,000 g and an impact weight diameter of 0.5π, was dropped on a flat sheet, whereupon the test specimen was visually observed to evaluate whitening. The backing stand inner diameter was 43 mm, and a flat sheet of 2 mm was cut into a size of 50 mm×50 mm to obtain a test specimen. Evaluation standards are o: no substantial whitening and x: remarkable whitening.

Method B: using a Du Pont impact tester, an impactor of 200 g was dropped from a height of 0.2 m (impact strength: 0.04 kg·m) or 0.1 m (impact strength: 0.02 kg·m), or an impactor of 400 g was dropped from a height of 0.5 m (impact strength: 0.20 kg·m) under such conditions that the impactor tip diameter was 12.7 mm and the backing stand diameter was 13 mm, and the whitening area upon expiration of 3 hours was evaluated. Other conditions were the same as in method A.

Bend whitening test

A molded product having a thickness of 1 mm was bent at an angle of 180° C. to see the presence or absence of whitening.

Measurement of the phase

In accordance with JIS K7105, the phase of molded product having a thickness of 1 mm was measured by a phase meter.

Heat resistance test

To evaluate the heat resistance, measurement of the peak of the crystal fusion by DSC (DSC-7, manufactured by Perkin Elmer) was carried out. The temperature raising rate was 10° C./min, whereby the peak temperature was obtained.

REFERENCE EXAMPLE 1

Synthesis of an ethylene/butene-1 copolymer elastomer

Into a 5 l autoclave, 1,000 ml of toluene and 500 ml of butene-1 were charged and heated to 40° C. Further, ethylene was introduced so that the total pressure became 8 kg/cm$^2$. Then, in a separate reactor, 10 ml of toluene, 5 mmol of methyl aluminoxane and 5 µmol of titanium (dimethyl(t-butylamido)(tetramethyl-η5-cyclopentadienyl-)silane) dichloride synthesized by a known method, were added, and this mixed solution was stirred for 20 minutes and then introduced into the autoclave to initiate the polymerization. This polymerization was carried out at 40° C. for 30 minuets while continuously introducing ethylene so that the total pressure was maintained at 8 kg/cm$^2$.

After completion of the polymerization, the polymer was washed with a large amount of ethanol and subjected to drying under reduced pressure at 60° C. for 12 hours. As a result, 44 g of an ethylene/butene-1 copolymer elastomer having a butene-1 content of 72 wt %, was obtained. The number average molecular weight was 108,000, Mw/Mn= 2.2, and the density was 0.864/cm$^3$.

EXAMPLE 1

60 g of a propylene/ethylene random copolymer (Tosoh Polypro J6080A, ethylene content: 3.2%, MFR (melt flow rate): 8 g/10 min), 20 g of the ethylene/butene-1 copolymer elastomer obtained in Reference Example 1, 2,000 ppm each of a hindered phenol type stabilizer (Irganox 1010, manufactured by Ciba Gaigy) and a phosphorus type stabilizer (Igafos 168, manufactured by Ciba Gaigy) as heat stabilizers, and 5,000 ppm of calcium stearate as a lubricant, were subjected to melt blending by means of a laboplastmil (internal capacity: 100 cc) at 60 rpm at 200° C. for 5 minuets. Then, the obtained composition was pressed at 200° C. for 10 minuets by means of a press molding machine to form molded products having thicknesses of 1 mm, 2 mm and 3.2 mm, respectively. The cooling temperature was 30° C. The evaluation results are shown in Table 1.

REFERENCE EXAMPLE 2

Synthesis of an ethylene/butene-1 copolymer elastomer

Into a 5 l autoclave, 400 ml of toluene and 1,100 ml of butene-1 were added and heated to 40° C. Further, ethylene was introduced so that the total pressure became 8 kg/cm$^2$. Then, in a separate reactor, 10 ml of toluene, 3 mmol of aluminoxane, and 3 µmol of diphenylmethane(cyclopentadienyl-9-fluorenyl) zirconium dichloride synthesized by a known method, were added, and this mixed solution was stirred for 20 minutes and then introduced into the autoclave to initiate the polymerization. This polymerization was carried out at 40° C. for 60 minutes while continuously introducing ethylene so that the total pressure was maintained at 8 kg/cm$^2$.

After completion of the polymerization, the polymer was washed with a large amount of ethanol and subjected to drying under reduced pressure at 60° C. for 12 hours. As a result, 102 g of an ethylene/butene-1 copolymer elastomer having a butene-1 content of 77 wt % was obtained. The number average molecular weight was 45,000, Mw/Mn=2.6, and the density was 0.863.

Various ethylene/butene-1 copolymer elastomers were obtained by conducting the same operation as above by changing the amount of butene-1. Further, various ethylene/ α-olefin copolymer elastomers were obtained by changing butene-1 to hexene-1, octene-1 and propylene. The synthesized copolymers are summarized in Table 1.

EXAMPLE 2

Molded products were prepared in the same manner as in Example 1 using the ethylene/butene-1 copolymer elastomers obtained in Reference Example 2 instead of the ethylene/butene-1 copolymer elastomer used in Example 1. The evaluation results are shown in Table 1.

EXAMPLE 3

A molded product was prepared in the same manner as in Example 1 using an ethylene/hexene-1 copolymer having a hexene-1 content of 77 wt % instead of the ethylene/butene-1 copolymer elastomer used in Example 1. The evaluation results are shown in Table 1.

EXAMPLE 4

A molded product was prepared in the same manner as in Example 1 except that an ethylene/hexene-1 copolymer elastomer having a hexene-1 content of 82 wt % was used instead of the ethylene/butene-1 copolymer elastomer used in Example 1. The evaluation results are shown in Table 1.

EXAMPLE 5

A molded product was prepared in the same manner as in Example 1 except that an ethylene/octene-1 copolymer elastomer having an octene-1 content of 88 wt % was used instead of the ethylene/butene-1 copolymer elastomer used in Example 1. The evaluation results are shown in Table 1.

EXAMPLE 6

A molded product was prepared in the same manner as in Example 1 except that a propylene homopolymer (Tosoh Polypro J5100A, MFR: 11 g/10 min) was used instead of the propylene/ethylene random copolymer. The evaluation results are shown in Table 1.

COMPARATIVE EXAMPLE 1

The propylene/ethylene random copolymer used in Example 1 was press-molded alone to obtain a molded product. However, the molding conditions were the same as in Example 1. The evaluation results are shown in Table 1.

COMPARATIVE EXAMPLE 2

The propylene homopolymer used in Example 6 was press-molded alone to obtain a molded product. However, the molding conditions were the same as Example 1. The evaluation results are shown in Table 2.

COMPARATIVE EXAMPLE 3

A molded product was prepared in the same manner as in Example 1 using an ethylene/butene-1 copolymer elastomer having a butene-1 content of 63 wt % instead of the ethylene/butene-1 copolymer elastomer used in Example 1. The evaluation results are shown in Table 2.

COMPARATIVE EXAMPLE 4

A molded product was prepared in the same manner as in Example 1 using an ethylene/hexene-1 copolymer elastomer having a hexene-1 content of 61 wt % instead of the ethylene/butene-1 copolymer elastomer used in Example 1. The evaluation results are shown in Table 2.

COMPARATIVE EXAMPLE 5

A molded product was prepared in the same manner as in Example 1 using an ethylene/hexene-1 copolymer elastomer having a hexene-1 content of 54 wt % instead of the ethylene/butene-1 copolymer elastomer used in Example 1. The evaluation results are shown in Table 2.

COMPARATIVE EXAMPLE 6

A molded product was prepared in the same manner as in Example 1 using an ethylene/octene-1 copolymer elastomer having a octene-1 content of 60 wt % instead of the ethylene/butene-1 copolymer elastomer used in Example 1. The evaluation results are shown in Table 2.

COMPARATIVE EXAMPLE 7

A molded product was prepared in the same manner as in Example 1 using an ethylene/propylene copolymer elastomer having a propylene content of 75 wt % instead of the ethylene/butene-1 copolymer elastomer used in Example 1. The evaluation results are shown in Table 2.

REFERENCE EXAMPLE 3

Synthesis of an ethylene/butene-1 copolymer elastomer

Into a 5 l autoclave, 500 ml of toluene and 1,000 ml of butene-1 were charged and heated to 40° C. Further, ethylene was introduced so that the total pressure became 4 kg/cm$^2$. Then, into a separate reactor, 10 ml of toluene, 3 mmol of methylaluminoxane, and 3 μmol of dimethylsilane diyl bis(2-methylindenyl) zirconium dichloride synthesized by a known method, were added, and this mixed solution was stirred for 20 minuets and then introduced into the autoclave to initiate the polymerization. This polymerization was carried out at 40° C. for 30 minuets while continuously introducing ethylene so that the total pressure was maintained at 4 kg/cm$^2$.

After completion of the polymerization, the polymer was washed with a large amount of ethanol and subjected to drying under reduced pressure at 60° C. for 12 hours. As a result, 54 g of an ethylene/butene-1 copolymer elastomer having a butene-1 content of 96 wt %, was obtained. The number average molecular weight was 76,000, Mw/Mn=2.4, and the density was 0.882. The melting point measured as the mainpeak by the DSC measurement, was 45° C.

COMPARATIVE EXAMPLE 8

A molded product was prepared in the same manner as in Example 1 using the ethylene/butene-1 copolymer elastomer obtained in Reference Example 3 instead of the ethylene/butene-1 copolymer elastomer used in Example 1. The evaluation results are shown in Table 2.

EXAMPLE 7

630 g of a propylene homopolymer (Tosoh Polypro J5100A, MFR: 11 g/10 min), 70 g of an ethylene/hexene-1 copolymer elastomer having a hexene-1 content of 73 wt %, 1,000 ppm of each of hindered phenol type stabilizer (Irganox 1010, manufactured by Ciba Gaigy) and a phosphorus type stabilizer (Irgafos 168, manufactured by Ciba Gaigy) as heat stabilizers, and 2,000 ppm of calcium stearate as a lubricant, were subjected to melt blending by means of a twin screw kneader (internal capacity: 1 l) at 30 rpm at 200° C. for 15 minuets. Then, the obtained composition was pelletized and molded into molded products having thicknesses of 1 mm, 2 mm and 3.2 mm, respectively, by an injection molding machine. The evaluation results are shown in Table 3.

EXAMPLES 8 TO 10

Instead of the propylene homopolymer used in Example 7, a propylene/ethylene block copolymer (Tosoh Polypro J7090B, MFR: 8.5 g/10 min) was used, and the propylene/ethylene block copolymer and ethylene/hexene-1 copolymer were blended in a weight ratio of 90/10, 97.5/2.5 and 99/1, respectively. In the same manner as in Example 7, molded products were obtained. The evaluation results are shown in Table 3.

COMPARATIVE EXAMPLE 9

The propylene homopolymer used in Example 7 was injection-molded alone to obtain a molded product. However, the molding conditions were the same as in Example 7. The evaluation results are shown in Table 3.

COMPARATIVE EXAMPLE 10

A molded product was prepared in the same manner as in Example 7 using an ethylene/hexene-1 copolymer elastomer having a hexene-1 content of 56 wt % instead of the ethylene/hexene-1 copolymer elastomer used in Example 7. The evaluation results are shown in Table 3.

COMPARATIVE EXAMPLE 11

The propylene/ethylene block copolymer used in Example 8 was injection-molded alone to obtain a molded product. However, the molding conditions were the same as in Example 8. The evaluation results are shown in Table 3.

COMPARATIVE EXAMPLE 12

A molded product was prepared in the same manner as in Example 8 using an ethylene/hexene-1 copolymer elastomer having a hexene-1 content of 56 wt % instead of the ethylene/hexene-1 copolymer elastomer used in Example 8. The evaluation results are shown in Table 3.

EXAMPLE 11 TO 16 AND COMPARATIVE EXAMPLES 13 TO 15

The propylene/ethylene random copolymer used in Example 1 or the propylene/ethylene block copolymer used in Example 8, and various ethylene/α-olefin copolymers were blended in a weight ratio of 50/50 or 25/75 to obtain molded products. The molded conditions were the same as in Example 1. The evaluation results are shown in Table 4.

TABLE 1

|  | Example 1 | Example 2 | Example 3 | Example 4 | Example 5 | Example 6 |
|---|---|---|---|---|---|---|
| Polypropylene resin |  |  |  |  |  |  |
| MFR(g/10 min) | 8 | 8 | 8 | 8 | 8 | 11 |
| Amount (wt %) | 75 | 75 | 75 | 75 | 75 | 75 |
| Copolymer |  |  |  |  |  |  |
| α-Olefin | butene-1 | butene-1 | hexene-1 | hexene-1 | octene-1 | butene-1 |
| α-Olefin content (wt %) | 72 | 77 | 77 | 82 | 88 | 72 |
| Density (g/cm$^3$) | 0.864 | 0.863 | 0.860 | 0.860 | 0.852 | 0.864 |
| Melting point (°C.) | — | — | — | — | — | — |
| Mn × 10$^{-4}$ | 10.8 | 4.5 | 9.8 | 9.9 | 7.6 | 10.8 |
| Mw/Mn | 2.2 | 2.6 | 2.0 | 2.1 | 2.1 | 2.2 |
| Compositional distribution[1] | 1.06 | 1.10 | 1.06 | 1.06 | 1.02 | 1.06 |
| tan δ[2] |  |  |  |  |  |  |
| Number of peaks | 1 | 1 | 1 | 1 | 1 | 1 |
| Shift temperature of PP phase (°C.) | 27.9 | 26.1 | 28.8 | 27.2 | 28.8 | 28.0 |
| Average particle size of disperse phases[3] (μm) | no disperse phase | no disperse phase | no disperse phase | no disperse phase | no disperse phase | no disperse phase |
| Izod impact strength (23° C.) (kg · cm/cm$^2$) | not broken | not broken | not broken | not broken | not broken | not broken |
| Impact whitening (method A) | ○ | ○ | ○ | ○ | ○ | ○ |
| Brend whitening | no whitening | no whitening | no whitening | no whitening | no whitening | no whitening |

[1][average α-olefin content (mol %) in low molecular weight fraction]/[average α-olefin content (mol %) in high molecular weight fraction]
[2]Maximum peak of tan δ based on the glass transition temperature obtained by dynamic viscoelasticity.
[3]Average particle size of the disperse phase obtained by image treatment of the result of the transmission electron microscopic observation.

TABLE 2

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Polypropylene resin | | | | | | | | |
| MFR (g/10 min) | 8 | 11 | 8 | 8 | 8 | 8 | 8 | 8 |
| Amount (wt %) | 100 | 100 | 75 | 75 | 75 | 75 | 75 | 75 |
| Copolymer | | | | | | | | |
| α-Olefin | — | — | butene-1 | hexene-1 | hexene-1 | octene-1 | propylene | butene-1 |
| α-Olefin content (wt %) | — | — | 63 | 61 | 54 | 60 | 75 | 96 |
| Density (g/cm$^3$) | — | — | 0.863 | 0.860 | 0.857 | 0.853 | 0.857 | 0.882 |
| Melting point (°C.) | — | — | | | | | | 45 |
| Mn × 10$^{-4}$ | — | — | 5.8 | 6.3 | 8.2 | 6.8 | 6.4 | 7.6 |
| Mw/Mn | — | — | 1.8 | 1.9 | 1.9 | 1.8 | 1.6 | 2.4 |
| Compositional distribution[1] | — | — | 1.04 | 1.05 | 1.04 | 1.04 | 1.02 | 1.07 |
| tan δ[2] | | | | | | | | |
| Number of peaks | 1 | 1 | 2 | 2 | 2 | 2 | 2 | 1 |
| Shift temperature PP phase (°C.) | — | — | 4.1 | 4.4 | 0.0 | 5.2 | 0.5 | 15.0 |
| Average particle size of disperse phase[3] (μm) | — | — | 0.2 | 0.1 | 2.0 | 1.5 | 1.0 | no disperse phase |
| Izod impact strength (23° C.) (kg · cm/cm$^2$) | 4.8 | 3.4 | not broken | not broken | not broken | not broken | 40 | 18 |
| Impact whitening (method A) | X | broken | X | X | X | X | X | X |
| Bend whitening | whitening | whitening | whitening | whitening | whitening | whitening | whitening | whitening |

[1] [average α-olefin content (mol %) in low molecular weight fraction]/[average α-olefin content (mol %) in high molecular weight fraction]
[2] Maximum peak of tan δ based on the glass transition temperature obtained by dynamic viscoelasticity.
[3] Average particle size of the disperse phase obtained by image treatment of the result of the transmission electron microscopic observation.

TABLE 3

|  | Example 7 | Example 8 | Example 9 | Example 10 | Comparative Example 9 | Comparative Example 10 | Comparative Example 11 | Comparative Example 12 |
|---|---|---|---|---|---|---|---|---|
| Polyproylene resin | | | | | | | | |
| MPR (g/10 nin) | 11 | 8.5 | 8.5 | 8.5 | 11 | 11 | 0.5 | 8.5 |
| Amount (wt %) | 90 | 90 | 97.S | 99 | 100 | 90 | 100 | 90 |
| Copolymer | | | | | | | | |
| α-Olefin | hexene-1 | hexene-1 | hexene-1 | hexene-1 | — | hexene-1 | — | hexene-1 |
| α-Olefin content (wt %) | 73 | 73 | 73 | 73 | — | 56 | — | 56 |
| Density (g/cm$^3$) | 0.855 | 0.855 | 0.855 | 0.855 | — | 0.854 | — | 0.854 |
| Melting point (°C.) | | | | | | | | |
| Mn × 10$^{-4}$ | 7.0 | 7.0 | 7.0 | 7.0 | — | 6.0 | — | 6.0 |
| Mw/Mn | 1.9 | 1.9 | 1.9 | 1.9 | — | 1.9 | — | 1.9 |
| Compositional distribution[1] | 1.02 | 1.02 | 1.02 | 1.02 | — | 1.02 | — | 1.02 |
| tan δ[2] | | | | | | | | |
| Number of peaks | 1 | 1 | 2 | 2 | 1 | 2 | 2 | 2 |
| Shift temperature of PP phase (°C.) | 7.0 | 12.0 | 1.8 | 1.3 | — | 0.0 | — | 0.0 |
| Average particle size of disperse phase[3] (μm) | no disperse phase | 2.0 | 2.0 | 2.0 | — | 1.0 | 2.0 | 2.0 |
| Izod impact strength (23° C.) (kg · cm/cm$^2$) | 14 | not broken | 28 | 22 | 6 | 16 | 18.6 | not broken |
| whitening area (method B) (mm$^2$) | | | | | | | | |
| Impact strength 0.02 kg · m | — | 7.1 | 17.3 | 20.0 | — | — | 27.0 | 21.0 |
| Impact strength 0.04 kg · m | no whitening | — | — | — | broken | 14 | — | — |
| Impact strength 0.20 kg · m | no whitening | — | — | — | broken | 140 | — | — |

[1] [average α-olefin content (mol %) in low molecular weight fraction]/[average α-olefin content (mol %) in high molecular weight fraction]
[2] Maximum peak of tan δ based on the glass transition temperature obtained by dynamic viscoelasticity.
[3] Average particle size of the disperse phase obtained by image treatment of the result of the transmission electron microscopic observation.

TABLE 4

|  | Example 11 | Example 12 | Example 13 | Example 14 | Example 15 | Example 16 | Comparative Example 13 | Comparative Example 14 | Comparative Example 15 |
|---|---|---|---|---|---|---|---|---|---|
| Polypropylene resin | | | | | | | | | |
| MFR(g/10 min) | 8 | 8 | 8 | 8 | 8 | 11 | 8 | 8 | 8 |
| Amount (wt %) | 50 | 50 | 50 | 50 | 50 | 50 | 50 | 50 | 50 |
| Copolymer | | | | | | | | | |
| α-Olefin | butene-1 | butene-1 | hexene-1 | hexene-1 | butene-1 | butene-1 | butene-1 | hexene-1 | propylene |
| α-Olefin content (wt %) | 72 | 77 | 77 | 82 | 77 | 72 | 53 | 54 | 75 |
| Density (g/cm$^3$) | 0.864 | 0.863 | 0.860 | 0.860 | 0.863 | 0.864 | 0.859 | 0.857 | 0.857 |
| Melting point (°C.) | | | | | | | | | |
| Mn × 10$^{-4}$ | 10.8 | 4.5 | 9.8 | 9.9 | 4.5 | 10.8 | 6.0 | 8.2 | 6.4 |
| Mw/Mn | 2.2 | 2.6 | 2.0 | 2.1 | 2.6 | 2.2 | 1.8 | 1.9 | 1.6 |
| Compositional distribution[1] | 1.06 | 1.10 | 1.06 | 1.06 | 1.10 | 1.06 | 1.04 | 1.04 | 1.02 |
| tan δ[2] | | | | | | | | | |
| Number of peaks | 1 | 1 | 1 | 1 | 1 | 1 | 2 | 2 | 2 |
| Shift temperature of PP phase (°C.) | 31.5 | 31.2 | 31.4 | 33.0 | 36.2 | 31.0 | 0.5 | 0.7 | 0.5 |
| Average particle size of disperse phases[3] (μm) | no disperse phase | no disperse phase | no disperse phase | no disperse phase | no disperse phase | no disperse phase | 2.0 | 2.0 | 2.0 |
| Breaking strength (kg/cm$^2$) | 150 | 150 | 130 | 140 | 100 | 150 | 90 | 80 | 90 |
| breaking elongation (%) | 1000 | 1100 | 1000 | 1100 | 1400 | 1000 | 150 | 390 | 200 |
| Hase (%) | 27 | 33 | 31 | 28 | 29 | 33 | 89 | 80 | 80 |
| Bend whitening | no whitening | no whitening | no whitening | no whitening | no whitening | no whitening | whitening | whitening | whitening |
| Impact whitening (method A) | ○ | ○ | ○ | ○ | ○ | ○ | X | X | X |
| Melting point (°C.) | 147 | 147 | 147 | 147 | 147 | 163 | 147 | 147 | 147 |

[1] [average α-olefin content (mol %) in low molecular weight fraction]/[average α-olefin content (mol %) in high molecular weight fraction]
[2] Maximum peak of tan δ based on the glass transition temperature obtained by dynamic viscoelasticity.
[3] Average particle size of the disperse phase obtained by image treatment of the result of the transmission electron microscopic observation.

As described foregoing, the resin composition of the present invention and its molded product have the glass transition temperatures substantially lowered and the cold resistance improved. At the same time, it is excellent in whitening resistance upon impact.

We claim:

1. A polypropylene resin composition comprising from 5 to 99.9 wt % of a polypropylene resin (A) and from 95 to 0.1 wt % of an ethylene/α-olefin copolymer elastomer (B) satisfying the following conditions (a) to (d):

(a) the α-olefin has a carbon number of from 4 to 20, (b) the α-olefin content is larger than 65 wt % and at most 95 wt %, (c) the density at 23° C. is less than 0.88 g/cm$^3$, and (d) no peak of crystal fusion is observed by a DSC method.

2. The polypropylene resin composition according to claim 1, characterized in that the glass transition temperature of the polypropylene phase representing the maximum peak temperature of the loss tangent (tan δ) obtained from the temperature dependency of the dynamic viscoelasticity, is lower by at least 1° C. than the polypropylene resin (A) alone.

3. The polypropylene resin composition according to claim 1, characterized in that only one peak of the loss tangent (tan δ) obtained from the temperature dependency of the dynamic viscoelasticity, is present in a temperature range of from −80° to 30° C.

4. The polypropylene resin composition according to claim 1, characterized in that no disperse phase having a size of at least 0.01 μm, exists.

5. The polypropylene resin composition according to claim 1, which comprises from 70 to 99.9 wt % of the polypropylene resin (A) and from 30 to 0.1 wt % of the ethylene/α-olefin copolymer elastomer (B).

6. A soft polypropylene resin composition according to claim 1, which comprises from 5 to 70 wt % of the polypropylene resin (A) and from 95 to 30 wt % of the ethylene/α-olefin copolymer elastomer (B).

7. A molded product obtained from the composition as defined in claim 1.

* * * * *